(12) United States Patent
Adams et al.

(10) Patent No.: US 10,198,274 B2
(45) Date of Patent: Feb. 5, 2019

(54) TECHNOLOGIES FOR IMPROVED HYBRID SLEEP POWER MANAGEMENT

(71) Applicant: Intel Corporation, Santa Clara, CA (US)

(72) Inventors: Nicholas J. Adams, Beaverton, OR (US); Erik C. Bjorge, Hillsboro, OR (US); Giri P. Mudusuru, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 741 days.

(21) Appl. No.: 14/670,939

(22) Filed: Mar. 27, 2015

(65) Prior Publication Data

US 2016/0282927 A1 Sep. 29, 2016

(51) Int. Cl.
*G06F 1/32* (2006.01)
*G06F 9/4401* (2018.01)
*G06F 13/24* (2006.01)
*G06F 21/57* (2013.01)
*G06F 21/79* (2013.01)

(52) U.S. Cl.
CPC .......... *G06F 9/4418* (2013.01); *G06F 1/3206* (2013.01); *G06F 13/24* (2013.01); *G06F 21/575* (2013.01); *G06F 21/79* (2013.01)

(58) Field of Classification Search
CPC ...... G06F 1/3287; G06F 13/24; G06F 21/575; G06F 21/79; G06F 2212/1052; G06F 9/4418; G06F 12/14
See application file for complete search history.

(56) References Cited

U.S. PATENT DOCUMENTS 6,446,213 B1 9/2002 Yamaki
6,691,234 B1 * 2/2004 Huff ...................... G06F 9/4418
                                                                    711/173

(Continued)

OTHER PUBLICATIONS

Shimpi, Anand Lal. "Intel's Haswell Architecture Analyzed: Building a New PC and a New Intel." RSS, AnandTech, Oct. 5, 2012, www.anandtech.com/show/6355/intels-haswell-architecture/3. (Year: 2012).*

(Continued)

*Primary Examiner* — Jaweed A Abbaszadeh
*Assistant Examiner* — Brian J Corcoran
(74) *Attorney, Agent, or Firm* — Barnes & Thornburg LLP (57) ABSTRACT

Technologies for hybrid sleep power management include a computing device with a processor supporting a low-power idle state. In a pre-boot firmware environment, the computing device reserves a memory block for firmware use and copies platform wake code to a secure memory location, such as system management RAM (SMRAM). At runtime, an operating system may execute with the processor in protected mode. In response to a request to enter a sleep or suspend state, the computing device generates a system management interrupt (SMI). In an SMI handler, the computing device copies the wake code from SMRAM to the reserved memory block. The computing device resumes from the SMI handler to the wake code with the processor in real mode. The wake code enters the low-power idle state and then jumps to a wake vector of the operating system after receiving a wake event. Other embodiments are described and claimed.

19 Claims, 3 Drawing Sheets

(56) References Cited

U.S. PATENT DOCUMENTS

| | | |
|---|---|---|
| 2006/0053325 A1 | 3/2006 | Chary |
| 2006/0136756 A1* | 6/2006 | Rothman .............. G06F 1/3203 |
| | | 713/300 |
| 2009/0150660 A1 | 6/2009 | Yao |
| 2013/0290759 A1 | 10/2013 | Kumar |
| 2014/0006799 A1 | 1/2014 | Zmudzinski |
| 2014/0047174 A1 | 2/2014 | Sakthikumar |
| 2014/0115368 A1 | 4/2014 | Muralidhar |
| 2014/0325197 A1 | 10/2014 | Lewis et al. |
| 2015/0154031 A1* | 6/2015 | Lewis ................... G06F 9/4406 |
| | | 713/2 |

OTHER PUBLICATIONS

International Search Report for PCT/US16/019588, dated Jul. 11, 2016 (3 pages).

Written Opinion for PCT/US16/019588, dated Jul. 11, 2016 (6 pages).

Extended European Search Report for European Patent Application No. 16773664.4, dated Aug. 10, 2018 (8 pages).

\* cited by examiner

TECHNOLOGIES FOR IMPROVED HYBRID SLEEP POWER MANAGEMENT

BACKGROUND

Energy efficiency is an increasingly important consideration for current computing devices. For portable devices such as laptops, tablets, and smartphones, energy efficiency directly affects battery life, which is an important part of the user experience. For server devices, energy efficiency directly affects cost, compute density, and thermal management. Many computing devices and processors support a reduced-power sleep state defined by the Advanced Configuration and Power Interface (ACPI) specification, also known as the "S3" state. In the ACPI S3 sleep state, volatile memory may remain powered on to preserve its contents while other components of the computing device such as the processor are powered down.

Current processors may also support a balance of different performance and power consumption levels. For example, processors may scale performance and power consumption to improve performance under load and to reduce power consumption when idle or lightly loaded. Current processors and devices may also support low-power usage models, which allow the device to achieve extremely low power consumption for certain usage models. For example, current computing devices and/or processors may support an S0ix low-power idle state, low-power audio playback, or other low-power states. Using S0ix and other modern low-power usage states may require operating system or other software support. Additionally, many current processors no longer support the ACPI S3 sleep state.

Computing devices typically include firmware responsible for hardware initialization, low-level hardware management, and managing the boot process. The main platform firmware responsible for booting the computing device may be implemented according to the Unified Extensible Firmware Interface ("UEFI") specification, which has several versions published by the Unified EFI Forum. The UEFI specification specifies an interface between the firmware of the computing device and the operating system of the computing device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
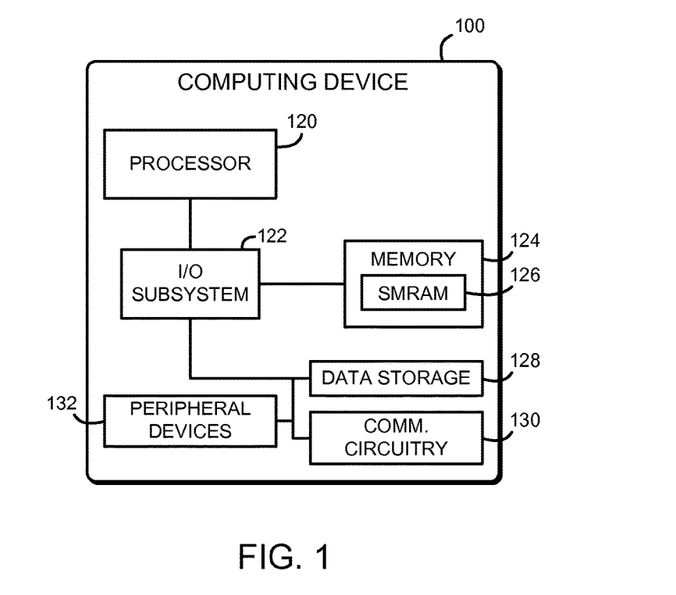
FIG. 1 is a simplified block diagram of at least one embodiment of a computing device for hybrid sleep power management.

Referring now to FIG. 1, an illustrative computing device 100 for hybrid sleep power management includes a processor 120, an I/O subsystem 122, a memory 124, a data storage device 128, and communications circuitry 130. In use, as described below, the computing device 100 executes a pre-boot firmware environment in which a block of memory is reserved and platform wake code is copied into system management RAM (SMRAM). The reserved memory block and the SMRAM are not accessible by the operating system or runtime applications of the computing device 100. At runtime, the computing device 100 generates a request to enter a power management sleep state such as the ACPI S3 sleep state. The computing device 100 traps the request to enter the sleep state and generates a system management interrupt (SMI). In response to the SMI, the processor 120 saves a copy of the current processor state and then invokes an SMI handler. The SMI handler copies the wake code from SMRAM into the firmware reserved memory block. The SMI handler modifies the saved processor state to resume execution in real mode, starting with the wake code stored in the reserved memory block. The wake code causes the computing device 100 to enter a low-power idle state such as S0ix. After exiting the low-power idle state, the wake code jumps to a wake vector of the operating system. Thus, the computing device 100 may allow an operating system designed to use the ACPI S3 to use the low-power idle state and gain associated efficiency improvements. Additionally, the computing device 100 may improve sleep performance while maintaining security by avoiding the need to reload and re-authenticate boot firmware from nonvolatile storage in response to each sleep request. Further, the computing device 100 may avoid the need to reset the processor 120 and reduce the amount of memory required for resume by keeping the processor 120 context intact.

The computing device 100 may be embodied as any type of device capable of hybrid sleep power management and otherwise performing the functions described herein. For example, the computing device 100 may be embodied as, without limitation, a laptop computer, a notebook computer, a tablet computer, a smartphone, a wearable computing device, a computer, a workstation, a server, a multiprocessor system, a consumer electronic device, a smart appliance, and/or any other computing device capable of hybrid sleep power management. As shown in FIG. 1, the illustrative computing device 100 includes the processor 120, the I/O subsystem 122, the memory 124, and the data storage device 128. Of course, the computing device 100 may include other or additional components commonly found in a computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100 such operating systems, applications, programs, libraries, and drivers. The memory 124 includes system management random access memory (SMRAM) 126, which may be embodied as a region of the memory 124 that is accessible by the processor 120 only in system management mode (SMM), which the processor 120 enters in response to a system management interrupt (SMI). The SMRAM 126 may include executable code and data for SMI handling. The I/O subsystem 122 may regulate access to the SMRAM 126, preventing code from accessing or modifying the SMRAM 126 when not executing in SMM. Thus, the contents of the SMRAM 126 may be inaccessible to the operating system, applications, and other runtime code executed by the computing device 100.

The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage device 128 may be embodied as any type of device or devices configured for short-term or long-term storage of data such as, for example, memory devices and circuits, memory cards, hard disk drives, solid-state drives, or other data storage devices. The data storage device 128 may store one or more operating systems and/or firmware environments that may be executed by the computing device 100. For example, the data storage device 128 may store a firmware volume as defined by the UEFI specification.

The computing device 100 may also include a communications circuitry 130, which may be embodied as any communication circuit, device, or collection thereof, capable of enabling communications between the computing device 100 and other remote devices over a computer network (not shown). The communications circuitry 130 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

The computing device 100 may further include one or more peripheral devices 132. The peripheral devices 132 may include any number of additional input/output devices, interface devices, and/or other peripheral devices. For example, in some embodiments, the peripheral devices 132 may include a touch screen, graphics circuitry, an audio device, a microphone, a camera, an environmental sensor, a keyboard, a mouse, and/or other input/output devices, interface devices, and/or peripheral devices.

Figure 2:
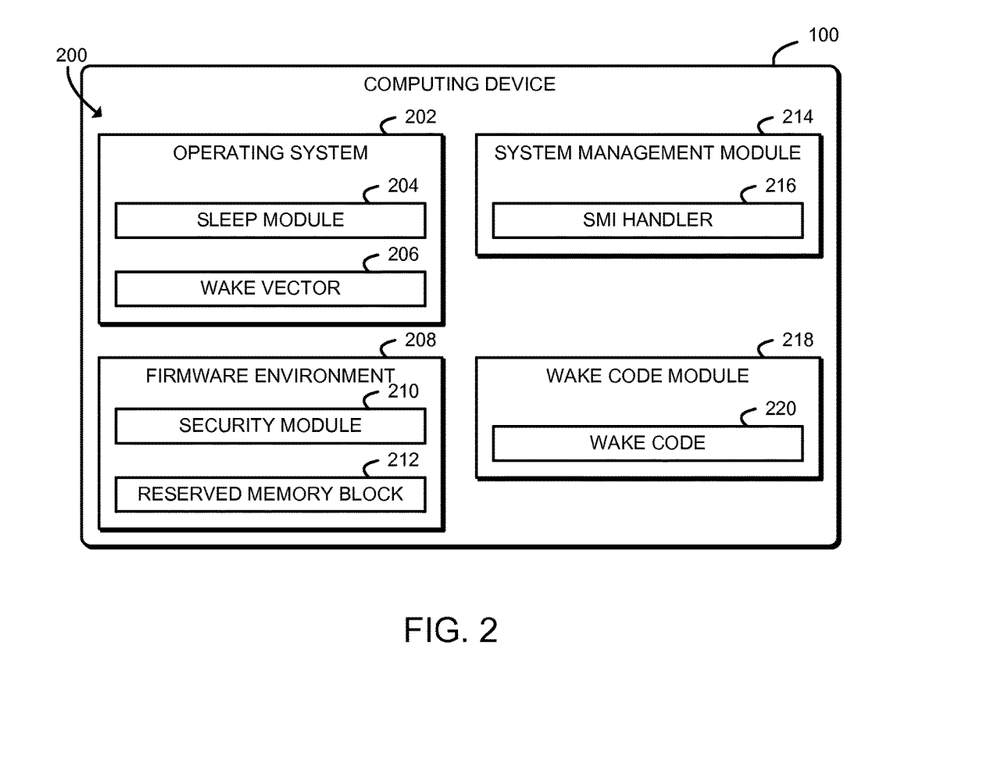
FIG. 2 is a simplified block diagram of at least one embodiment of an environment of the computing device of FIG. 1.

Referring now to FIG. 2, in the illustrative embodiment, the computing device 100 establishes an environment 200 during operation. The illustrative embodiment 200 includes an operating system 202, a firmware environment 208, a system management module 214, and a wake code module 218. The operating system 202 further includes a sleep module 204, and the firmware environment 208 further includes a security module 210. The various modules of the environment 200 may be embodied as hardware, firmware, software, or a combination thereof. For example the various modules, logic, and other components of the environment 200 may form a portion of, or otherwise be established by, the processor 120 or other hardware components of the computing device 100. As such, in some embodiments, any one or more of the modules of the environment 200 may be embodied as a circuit or collection of electrical devices (e.g., a sleep circuit, a security circuit, a system management circuit, etc.).

The operating system 202 may be embodied as any operating system, guest operating system, hypervisor, virtual machine monitor, or other control structure of the computing device 100. As described further below, the operating system 202 takes control of the computing device 100 after the firmware environment 208 terminates boot services. The operating system 202 performs power management functions, including managing system states as described by the ACPI specification. The sleep module 204, established by the operating system 202, is configured to generate requests to enter a sleep power management mode such as the ACPI S3 sleep mode, for example by writing a predetermined value to a power management control register. The sleep module 204 is configured to generate the request to enter the ACPI S3 sleep state with the processor 120 in a protected mode. The operating system 202 further includes a wake vector 206. The wake vector 206 may be embodied as a memory address, function, subroutine, or other entry point that may be executed when the computing device 100 exits the ACPI S3 sleep state. The wake vector 206 may be executed with the processor 120 in real mode.

The firmware environment 208 may be embodied as any pre-boot firmware environment that initializes and configures components of the computing device 100 prior to passing control of the computing device 100 to the operating system 202. For example, the firmware environment 208 may be embodied as a UEFI-compliant firmware environment. As described above, the firmware environment 208 establishes the security module 210.

The security module 210 is configured to reserve a reserved memory block 212 for use by the firmware environment 208. After being reserved, the operating system 202 does not allow drivers and/or applications to access the reserved memory block 212. The reserved memory block 212 may be accessed by low-level components of the operating system 202 such as a hardware abstraction layer; however, the operating system 202 does not store any information in the reserved memory block 212 that cannot be overwritten during a sleep state transition. The security module 210 is further configured to store the memory address of the reserved memory block 212 in a secure memory location such as the SMRAM 126. The security module 210 is also configured to copy platform wake code 220, described further below, into the secure memory location. In some embodiments, the security module 210 is configured to authenticate the firmware environment 208 or other boot code, and to boot the operating system 202 after storing the wake code 220 in the secure memory location.

The system management module 214 is configured to trigger a system management interrupt (SMI) in response to a request to enter the sleep power management mode generated by the operating system 202. The computing device 100 may execute an SMI handler 216 in response to triggering the SMI. The SMI handler 216 may be embodied as any function, subroutine, interrupt service routine, or other code that may be executed by the processor 120 to handle the SMI. The SMI handler 216 may be stored in the SMRAM 126 or other secure memory location that is not accessible by the operating system 202. The system management module 214 is further configured to copy the wake code 220 from the secure memory location (e.g., the SMRAM 126) to the reserved memory block 212 in response to triggering the SMI. The system management module 214 is configured to resume execution of the computing device 100, after completing the SMI handler 216, with the processor 120 in real mode, starting at the wake code 220 stored in the reserved memory block 212. The system management module 214 may save a processor state of the processor 120 to the secure memory location (e.g., the SMRAM 126), and may modify the saved processor state to execute in real mode and may modify saved a instruction pointer register value and/or saved segment register values to cause execution to resume at the wake code 220 in the reserved memory block 212.

The wake code module 218 is configured to enter a low-power idle state such as S0ix and then jump to the wake vector 206 of the operating system 202 when the computing device 100 leaves the low-power idle state in response to a wake event. The wake code module 218 may also be configured to perform other operations typically performed when entering or leaving the power management sleep state, such as storing device state information for one or more peripheral devices 132 and/or updating one or more power management status register based on the wake event. The functions of the wake code module 218 may be performed by the platform wake code 220, which may be embodied as any function, subroutine, or other executable code that may be executed by the processor 120 in real mode. The wake code 220 may be stored in nonvolatile storage that is accessible to the firmware environment 208, such as a firmware volume of the data storage device 128 or platform flash. As described above, the wake code 220 is copied to the secure memory location (e.g., the SMRAM 126) by the firmware environment 208 and then is copied to the reserved memory block 212 by the SMI handler 216 in response to an SMI. Therefore, the wake code 220 may not be modified by the operating system 202 after being loaded from nonvolatile storage and thus may not need to be authenticated in response to a request to enter the power management sleep state.

Figure 3:
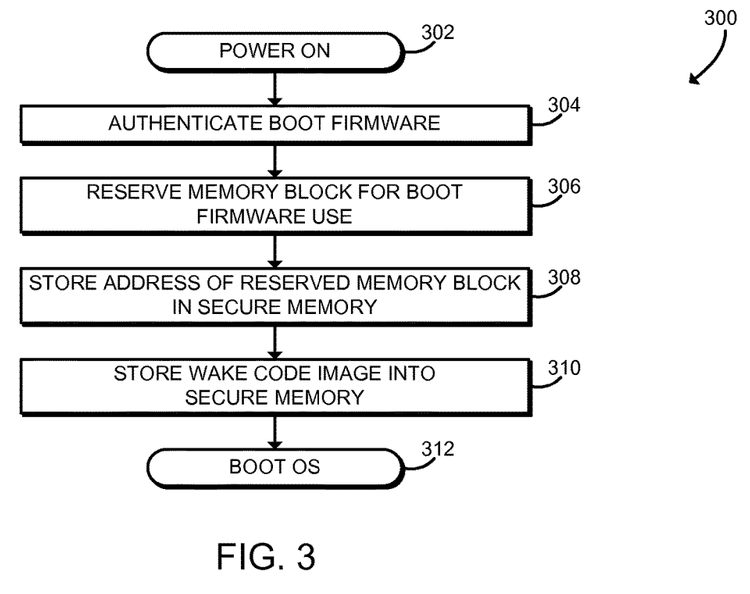
FIG. 3 is a simplified flow diagram of at least one embodiment of a method for platform boot that may be executed by the computing device of FIGS. 1 and 2.

Referring now to FIG. 3, in use, the computing device 100 may execute a method 300 for platform boot. The method 300 begins in block 302, in which the computing device 100 powers on. The computing device 100 may power on, for example, in response to a user command such as a button press, in response to being connected to an external power supply, or in response to any other appropriate event. The computing device 100 may also power on in response to a soft or hard reset or other restart event. The subsequent processes of the method 300 may be executed by the firmware environment 208 prior to the execution of the operating system 202. Thus, the firmware environment 208 may exercise full control of the computing device 100 during execution of the method 300.

In block 304, the computing device 100 authenticates boot firmware. The computing device 100 may authenticate, for example, one or more firmware images for the boot firmware that are stored in nonvolatile memory such as a platform flash memory chip, a firmware volume of the data storage device 128, or other storage. The computing device 100 may authenticate the firmware images, for example, by validating a digital signature associated with each particular firmware image against a set of trusted certificates. The computing device 100 may, for example, perform the secure boot process described in the UEFI specification. Authenticating the boot firmware may provide a root of trust prior to loading or executing other components of the computing device 100 such as components of the firmware environment 208, the operating system 202, the SMI handler 216, and/or the wake code 220.

In block 306, the computing device 100 reserves the reserved memory block 212 for use by the firmware environment 208. After being reserved, the contents of the reserved memory block 212 may not be modified or otherwise accessed by drivers and/or applications under the control of the operating system 202 or other unauthorized processes of the computing device 100. The computing device 100 may reserve the reserved memory block 212 using any appropriate technique. For example, the firmware environment 208 may expose a memory map or other data tables to the operating system 202 that exclude the reserved memory block 212.

In block 308, the computing device 100 stores the memory address of the reserved memory block 212 into a secure memory location such as a location within the SMRAM 126. The secure memory location may not be modified or otherwise accessed by the operating system 202 or other unauthorized processes of the computing device 100. However, the secure memory location may be accessed by the computing device 100 when handling a request to enter sleep mode, as described further below in connection with FIG. 5. For example, the SMRAM 126 is only accessible to the computing device 100 when the processor 120 is in system management mode (SMM) while handling a system management interrupt (SMI). Thus, the operating system 202 and any applications and/or drivers executed by the operating system 202 may not access the SMRAM 126.

In block 310, the computing device 100 stores a copy of the wake code 220 into the secure memory location such as a location within the SMRAM 126. As described above, the copy of the wake code 220 stored in the secure memory location may not be modified or otherwise accessed by the operating system 202 or other unauthorized processes of the computing device 100. The copy of the wake code 220 stored in the secure memory location may be accessed by the computing device 100 when handling a request to enter sleep mode, such as when the processor 120 is in SMM while handling an SMI.

In block 312, the computing device 100 boots the operating system 202. The computing device 100 may also perform any additional pre-boot operations required to boot the operating system 202. For example, the computing device 100 may perform the boot process described by the UEFI standard including, for example, establishing a driver execution environment, loading firmware drivers and applications, performing boot device selection, executing an operating system loader, and/or terminating boot services. After loading the operating system 202, the method 300 is completed, and the firmware environment 208 is no longer in full control of the computing device 100. Certain run-time services or other components of the firmware environment 208 may remain active while the operating system 202 is in control of the computing device 100.

Figure 4:
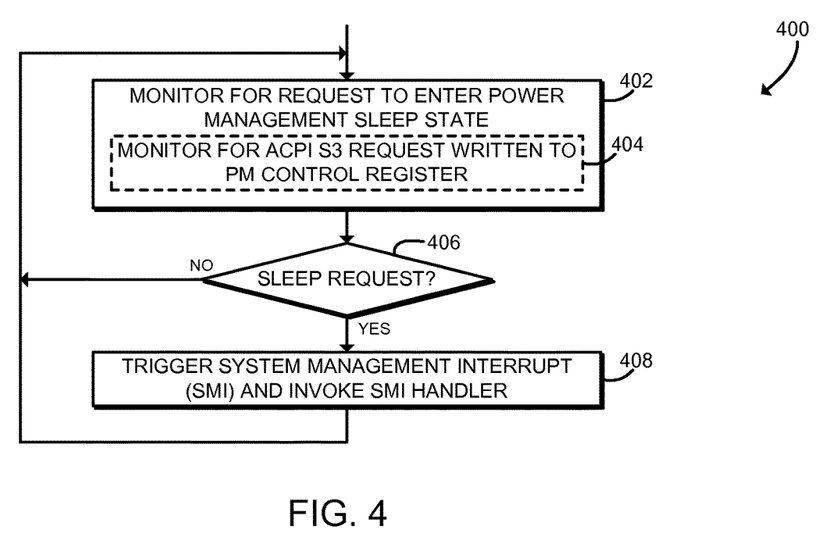
FIG. 4 is a simplified flow diagram of at least one embodiment of a method for power management sleep invocation that may be executed by the computing device of FIGS. 1 and 2.

Referring now to FIG. 4, in use, the computing device 100 may execute a method 400 for power management sleep invocation. The method 400 may be executed by hardware, firmware, and/or software of the computing device 100 at runtime, that is, while the operating system 202 is in full control of the computing device 100. The method 400 begins in block 402, in which the computing device 100 monitors for a request to enter a power management sleep state. In some embodiments, in block 404 the computing device 100 monitors for an ACPI S3 sleep request written to a power management control register. For example, the operating system 202 may write to the power management control register to request that the computing device 100 enter the ACPI S3 sleep state. The operating system 202 may look up the appropriate power management control register in one or more system description tables or other data structures established by the firmware environment 208. The computing device 100 may use any technique to monitor for the S3 sleep request. For example, the computing device 100 may trap writes to the power management control register. In block 406, the computing device 100 determines whether an S3 sleep request has been detected. If not, the method 400 loops back to block 402 to continue monitoring for sleep requests. If a sleep request has been detected, the method 400 advances to block 408.

In block 408, the computing device 100 triggers a system management interrupt (SMI) and invokes the SMI handler 216. Firmware and/or software of the computing device 100 may generate the SMI, and the processor 120 may automatically switch to system management mode (SMM) and invoke the SMI handler 216. As further described below in connection with FIGS. 5 and 6, after invocation of the SMI handler 216, the computing device 100 may enter a low-power idle state. After exiting the low-power idle state and resuming full-power execution, the method 400 loops back to block 402 to continue monitoring for sleep requests.

Figure 5:
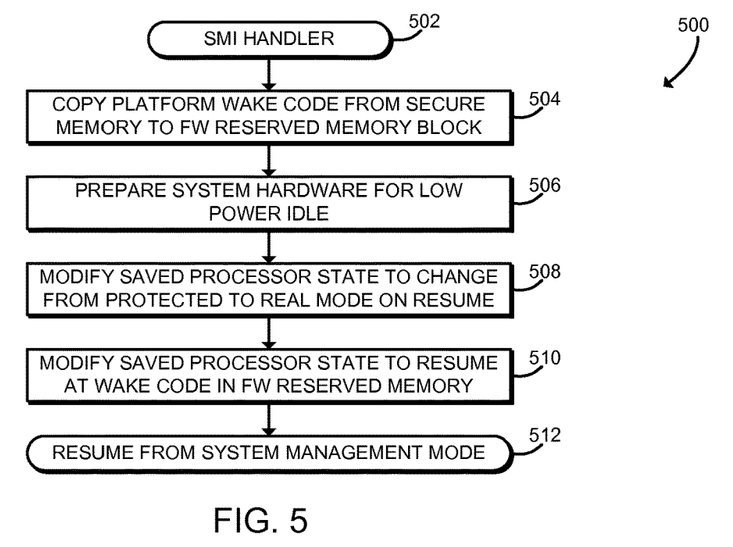
FIG. 5 is a simplified flow diagram of at least one embodiment of a method for system management interrupt handling that may be executed by the computing device of FIGS. 1 and 2.

Referring now to FIG. 5, in use, the computing device 100 may execute a method 500 for system management interrupt handling. The method 500 begins in block 502, in which the computing device 100 invokes the SMI handler 216. As described above in connection with block 408 of FIG. 4, the SMI handler 216 may be invoked by the processor 120 in response to a system management interrupt (SMI) generated when the computing device 100 has requested entering the power management sleep state. Prior to executing the SMI handler 216, the processor 120 enters system management mode (SMM), which is a specialized processor mode that allows the processor 120 to access the SMRAM 126. Additionally, prior to executing the SMI handler 216, the processor 120 saves its current processor state to the SMRAM 126. The saved processor state may include, for example, copies of register values of the processor 120 immediately prior to entering SMM. The saved processor state may be used to allow the processor 120 to resume execution after completion of the SMI handler 216.

In block 504, the computing device 100 copies the platform wake code 220 from the secure memory location (e.g., the SMRAM 126) to the firmware reserved memory block 212. As described above in connection with block 310 of FIG. 3, the platform wake code 220 was previously stored in the SMRAM 126 by the boot firmware in the pre-boot firmware environment 208. The computing device 100 may locate the reserved memory block 212 using the memory address stored in the secure memory location by the boot firmware, as described above in connection with block 308 of FIG. 3. Because the SMRAM 126 is inaccessible to the operating system 202 or other unauthorized code, the copy of the platform wake code 220 stored in the SMRAM 126 may be trusted by the SMI handler 216 without further authentication, based on the previous authentication of the boot firmware. Additionally, the platform wake code 220 may be copied into the main memory 124 without accessing a potentially slow firmware storage device such as the data storage device 128 or platform nonvolatile flash memory. In some embodiments, copying the platform wake code 220 from the SMRAM 126 rather than from nonvolatile storage may save about 100 milliseconds for each sleep request.

In block 506, the computing device 100 prepares system hardware for entering the low-power idle state. The computing device 100 may, for example, initialize a platform system-on-a-chip (SoC) for entering a low-power state such as C10 and/or SLP_S0. Additionally, the computing device 100 may initialize latency tolerance reporting (LTR) values across subsystems, power down a display, or otherwise perform SoC-specific preparations.

In block 508, the computing device 100 modifies the saved processor state to cause the processor 120 to change from a protected mode to a real mode on resume from the SMI handler 216. While executing the operating system 202, the processor 120 executes in a protected mode that provides virtual memory addressing, memory paging, and other features. The particular type of protected mode in use may depend on the processor 120 and/or the operating system 202 in use. For example, the processor 120 may execute the operating system 202 in x86 protected mode or in IA-32e mode on Intel® architecture processors. Thus, the saved processor state stored in the SMRAM 126 may include one or more register values indicating that the processor 120 was executing in protected mode immediately prior to the invocation of the SMI handler 216. The computing device 100 may write one or more new register values to the saved processor state that correspond to real mode. Thus, when the saved processor state is restored to the processor 120, the processor 120 may resume execution in real mode. Real mode may be embodied as, for example, a segmented addressing mode without virtual memory addressing, memory paging, or other protected mode features. In particular, real mode may be the same mode used by the processor 120 when initially booting and/or when exiting from the ACPI S3 sleep state.

In block 510, the computing device 100 modifies the saved processor state to resume execution at the wake code 220 stored in the firmware reserved memory block 212. In particular, the computing device 100 may write a value corresponding to the start of the wake code 220 to the saved instruction pointer register in the saved processor state. Thus, the new value of the saved instruction pointer register points to the start of the wake code 220 in the firmware reserved memory block 212. The computing device 100 may also write corresponding values to saved segment registers in the saved processor state. Thus, when the saved processor state is restored to the processor 120, the processor 120 will load the instruction pointer value with the address of the wake code 220 in the firmware reserved memory block 212 and then immediately begin executing the wake code 220 from the firmware reserved memory block 212.

In block 512, the computing device 100 resumes from system management mode (SMM). The computing device 100 may, for example, execute a processor instruction such as RSM to resume from SMM. After executing the RSM instruction, the SMI handler 216 is completed. In response to the RSM instruction, the processor 120 reloads the saved processor state from the SMRAM 126 and continues execution based on the contents of the saved processor state. Thus, the processor 120 stops executing in SMM and starts executing in real mode, as described above in connection with block 508. The processor 120 starts executing instructions from the wake code 220 located in the firmware reserved memory block 212, as described above in connection with block 510.

Figure 6:
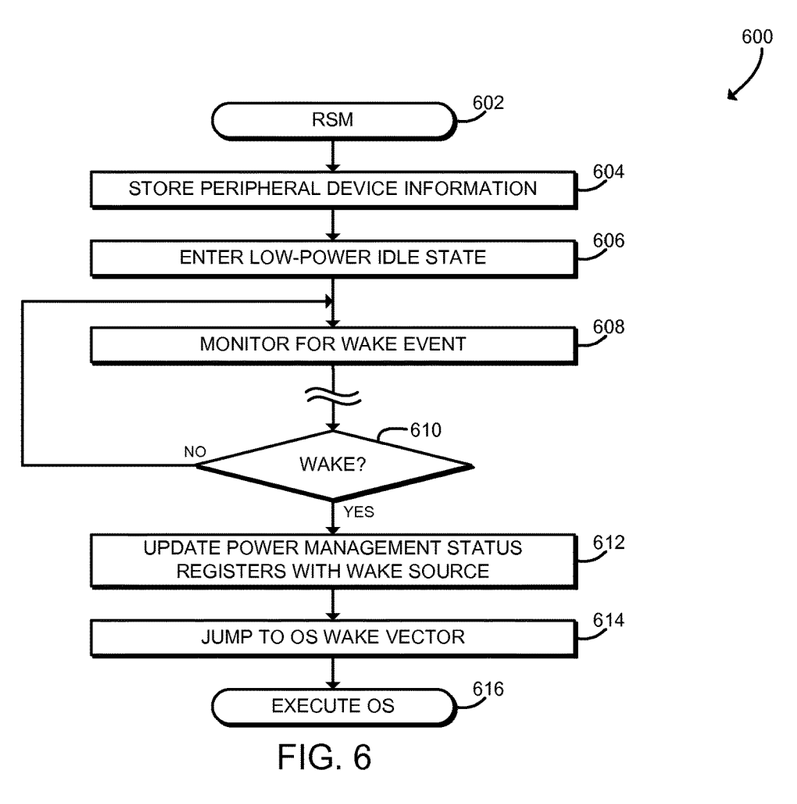
FIG. 6 is a simplified flow diagram of at least one embodiment of a method for low-power idle and wake that may be executed by the computing device of FIGS. 1 and 2.

Referring now to FIG. 6, in use, the computing device 100 may execute a method 600 for low-power idle and wake. The method 600 may be executed, for example, during execution of the wake code 220 located in the firmware reserved memory block 212. The method 600 begins in block 602, in which the computing device 100 resumes from the SMI handler 216. As described above in connection with block 512 of FIG. 5, after invocation of the SMI handler 216, the computing device 100 resumes execution with the processor 120 in real mode, starting with the wake code 220 located in the firmware reserved memory block 212.

In block 604, the computing device 100 stores peripheral device 132 state information. The computing device 100 may store any state information or other data associated with the peripheral devices 132 or other components of the computing device 100 that is typically required by the operating system 202 to be saved prior to entering the ACPI S3 sleep state.

In block 606, the computing device 100 enters the low-power idle state. The computing device 100 may enter any low-power state that preserves the contents of the volatile memory 124, the processor 120 registers, and other volatile state of the computing device 100 and that allows for fast wake. The computing device 100 does not, however, enter an ACPI sleep state such as S3. For example, the computing device 100 may enter an S0ix state, and the processor 120 may enter a low-power state such as the C10 state. In block 608, the computing device 100 monitors for a wake event. The computing device 100 may use any technique to monitor for wake events. For example, the computing device 100 may execute an MWAIT processor instruction and then wait in the low-power idle state until the wake event (e.g., a memory or I/O write event) has occurred. In some embodiments, exiting from the low-power state—that is, returning to a full-power state—may require about 60 to 100 milliseconds. In block 610, the computing device 100 determines whether a wake event has occurred. If not, the method 600 loops back to block 608 to continue monitoring for the wake event. If a wake event has occurred, the method 600 advances to block 612.

In block 612, the computing device 100 updates one or more power management status registers with the appropriate wake source. The computing device 100 may update the power management status registers based on requirements of the ACPI specification. In block 614, the computing device 100 jumps to the wake vector 206. The wake vector 206 may be embodied as a memory address associated with an operating system function or other routine used to wake the computing device 100 from the ACPI S3 sleep state. The processor 120 continues execution from the wake vector 206 in real mode.

In block 616, the computing device 100 executes the operating system 202. The operating system 202 returns the computing device 100 to a full-power operational mode such as the S0 active mode. The operating system 202 may also perform operations typically performed when resuming from the ACPI S3 sleep state, such as reloading saved state of one or more peripheral devices 132 and/or transitioning the processor 120 to protected mode. After handing off execution from the wake code 220 to the operating system 202, the method 600 is completed. The computing device 100 may continue executing in the full power mode and monitoring for requests to enter the ACPI S3 sleep state as described above in connection with FIG. 4.

EXAMPLES

Illustrative examples of the technologies disclosed herein are provided below. An embodiment of the technologies may include any one or more, and any combination of, the examples described below.

Example 1 includes a computing device for hybrid sleep power management, the computing device comprising a security module to: (i) reserve, during a pre-boot firmware environment of the computing device, a reserved memory block and (ii) store, during the pre-boot firmware environment, a wake routine in a secure memory location that is not accessible by an operating system of the computing device;

a system management module to: (i) copy, by a system management interrupt handler of the computing device, the wake routine from the secure memory location to the reserved memory block in response to a request to enter a sleep power management mode generated by the operating system in a first processor mode; and (ii) resume, by the system management interrupt handler, execution of the computing device in a second processor mode starting at the wake routine stored in the reserved memory block; and a wake code module to enter, by the wake routine of the computing device, a low-power idle state in response to resumption of execution in the second processor mode.

Example 2 includes the subject matter of Example 1, and wherein the system management module is further to trigger a system management interrupt in response to the request to enter the sleep power management mode; and to copy the wake routine comprises to copy the wake routine in response to triggering of the system management interrupt.

Example 3 includes the subject matter of any of Examples 1 and 2, and wherein the first processor mode comprises a protected mode and the second processor mode comprises a real mode.

Example 4 includes the subject matter of any of Examples 1-3, and wherein the security module is further to store, during the pre-boot firmware environment, an address of the reserved memory block in the secure memory location; wherein to copy the wake routine from the secure memory location to the reserved memory block comprises to copy the wake routing using the address of the reserved memory block stored in the secure memory location.

Example 5 includes the subject matter of any of Examples 1-4, and wherein the security module is further to authenticate the pre-boot firmware environment; to reserve the reserved memory block comprises to reserve the reserved memory block in response to authentication of the pre-boot firmware environment; and to store the wake routine in the secure memory location comprises to store the wake routine in the secure memory location in response to authentication of the pre-boot firmware environment.

Example 6 includes the subject matter of any of Examples 1-5, and wherein the secure memory location comprises a system management mode memory region of the computing device.

Example 7 includes the subject matter of any of Examples 1-6, and wherein the security module is further to boot the operating system in response to storage of the wake routine in the secure memory location.

Example 8 includes the subject matter of any of Examples 1-7, and further including a sleep module to generate, by the operating system, the request to enter the sleep power management mode.

Example 9 includes the subject matter of any of Examples 1-8, and wherein to generate the request to enter the sleep power management mode comprises to generate a request to enter an ACPI S3 state.

Example 10 includes the subject matter of any of Examples 1-9, and wherein to generate the request to enter the sleep power management mode comprises to write a predetermined value to a power management control register.

Example 11 includes the subject matter of any of Examples 1-10, and wherein the system management module is further to initialize, by the system management interrupt handler, a hardware component of the computing device for the low-power idle state.

Example 12 includes the subject matter of any of Examples 1-11, and wherein the system management module is further to save a processor state of a processor of the computing device to the secure memory location to generate a saved processor state in response to triggering of the system management interrupt; and modify, by the system management interrupt handler, the saved processor state to execute in the second processor mode; wherein to resume execution of the computing device comprises to resume execution of the computing device in response to modification of the saved processor state.

Example 13 includes the subject matter of any of Examples 1-12, and wherein the system management module is further to modify, by the system management interrupt handler, a saved instruction pointer register value of the saved processor state to point to the wake routine stored in the reserved memory block; wherein to resume execution of the computing device further comprises to resume execution of the computing device in response to modification of the saved instruction pointer register value.

Example 14 includes the subject matter of any of Examples 1-13, and wherein the low-power idle state comprises an S0ix processor state.

Example 15 includes the subject matter of any of Examples 1-14, and wherein the wake code module is further to store, by the wake routine, a device state of a peripheral device of the computing device in response to resumption of execution of the computing device; wherein to enter the low-power idle state comprises to enter the low-power idle state in response to storage of the device state.

Example 16 includes the subject matter of any of Examples 1-15, and wherein the wake code module is further to jump, by the wake routine, to a wake vector of the operating system in response to entrance to the low-power idle state.

Example 17 includes the subject matter of any of Examples 1-16, and wherein the wake code module is further to determine whether a wake event has occurred in response to entrance to the low-power idle state; and update, by the wake routine, a power management status register based on the wake event in response to a determination that the wake event has occurred; wherein to jump to the wake vector comprises to jump to the wake vector in response to an update of the power management status register.

Example 18 includes a method for hybrid system sleep, the method comprising reserving, during a pre-boot firmware environment of a computing device, a reserved memory block; storing, during the pre-boot firmware environment of the computing device, a wake routine in a secure memory location that is not accessible by an operating system of the computing device; copying, by a system management interrupt handler of the computing device, the wake routine from the secure memory location to the reserved memory block in response to a request to enter a sleep power management mode generated by the operating system in a first processor mode; resuming, by the system management interrupt handler, execution of the computing device in a second processor mode starting at the wake routine stored in the reserved memory block; and entering, by the wake routine of the computing device, a low-power idle state in response to resuming execution in the second processor mode.

Example 19 includes the subject matter of Example 18, and further including triggering, by the computing device, a system management interrupt in response to the request to enter the sleep power management mode; wherein copying the wake routine comprises copying the wake routine in response to triggering the system management interrupt.

Example 20 includes the subject matter of any of Examples 18 and 19, and wherein the first processor mode comprises a protected mode and the second processor mode comprises a real mode.

Example 21 includes the subject matter of any of Examples 18-20, and further including storing, during the pre-boot firmware environment, an address of the reserved memory block in the secure memory location; wherein copying the wake routine from the secure memory location to the reserved memory block comprises copying the wake routine using the address of the reserved memory block stored in the secure memory location.

Example 22 includes the subject matter of any of Examples 18-21, and further including authenticating, by the computing device, the pre-boot firmware environment; wherein reserving the reserved memory block comprises reserving the reserved memory block in response to authenticating the pre-boot firmware environment; and wherein storing the wake routine in the secure memory location comprises storing the wake routine in the secure memory location in response to authenticating the pre-boot firmware environment.

Example 23 includes the subject matter of any of Examples 18-22, and wherein the secure memory location comprises a system management mode memory region of the computing device.

Example 24 includes the subject matter of any of Examples 18-23, and further including booting, by the computing device, the operating system in response to storing the wake routine in the secure memory location.

Example 25 includes the subject matter of any of Examples 18-24, and further including generating, by the operating system, the request to enter the sleep power management mode.

Example 26 includes the subject matter of any of Examples 18-25, and wherein generating the request to enter the sleep power management mode comprises generating a request to enter an ACPI S3 state.

Example 27 includes the subject matter of any of Examples 18-26, and wherein generating the request to enter the sleep power management mode comprises writing a predetermined value to a power management control register.

Example 28 includes the subject matter of any of Examples 18-27, and further including initializing, by the system management interrupt handler, a hardware component of the computing device for the low-power idle state.

Example 29 includes the subject matter of any of Examples 18-28, and further including saving, by the computing device, a processor state of a processor of the computing device to the secure memory location to generate a saved processor state in response to triggering the system management interrupt; and modifying, by the system management interrupt handler, the saved processor state to execute in the second processor mode; wherein resuming execution of the computing device comprises resuming execution of the computing device in response to modifying the saved processor state.

Example 30 includes the subject matter of any of Examples 18-29, and further including modifying, by the system management interrupt handler, a saved instruction pointer register value of the saved processor state to point to the wake routine stored in the reserved memory block; wherein resuming execution of the computing device further comprises resuming execution of the computing device in response to modifying the saved instruction pointer register value.

Example 31 includes the subject matter of any of Examples 18-30, and wherein entering the low-power idle state comprises entering an S0ix processor state.

Example 32 includes the subject matter of any of Examples 18-31, and further including storing, by the wake routine, a device state of a peripheral device of the computing device in response to resuming execution of the computing device; wherein entering the low-power idle state comprises entering the low-power idle state in response to storing the device state.

Example 33 includes the subject matter of any of Examples 18-32, and further including jumping, by the wake routine, to a wake vector of the operating system in response to entering the low-power idle state.

Example 34 includes the subject matter of any of Examples 18-33, and further including determining, by the computing device, whether a wake event has occurred in response to entering the low-power idle state; and updating, by the wake routine, a power management status register based on the wake event in response to determining that the wake event has occurred; wherein jumping to the wake vector comprises jumping to the wake vector in response to updating the power management status register.

Example 35 includes a computing device comprising a processor; and a memory having stored therein a plurality of instructions that when executed by the processor cause the computing device to perform the method of any of Examples 18-34.

Example 36 includes one or more machine readable storage media comprising a plurality of instructions stored thereon that in response to being executed result in a computing device performing the method of any of Examples 18-34.

Example 37 includes a computing device comprising means for performing the method of any of Examples 18-34.

Example 38 includes a computing device for hybrid sleep power management, the computing device comprising means for reserving, during a pre-boot firmware environment of a computing device, a reserved memory block; means for storing, during the pre-boot firmware environment of the computing device, a wake routine in a secure memory location that is not accessible by an operating system of the computing device; means for copying, by a system management interrupt handler of the computing device, the wake routine from the secure memory location to the reserved memory block in response to a request to enter a sleep power management mode generated by the operating system in a first processor mode; means for resuming, by the system management interrupt handler, execution of the computing device in a second processor mode starting at the wake routine stored in the reserved memory block; and means for entering, by the wake routine of the computing device, a low-power idle state in response to resuming execution in the second processor mode.

Example 39 includes the subject matter of Example 38, and further including means for triggering a system management interrupt in response to the request to enter the sleep power management mode; wherein the means for copying the wake routine comprises means for copying the wake routine in response to triggering the system management interrupt.

Example 40 includes the subject matter of any of Examples 38 and 39, and wherein the first processor mode comprises a protected mode and the second processor mode comprises a real mode.

Example 41 includes the subject matter of any of Examples 38-40, and further including means for storing, during the pre-boot firmware environment, an address of the reserved memory block in the secure memory location; wherein the means for copying the wake routine from the secure memory location to the reserved memory block comprises means for copying the wake routing using the address of the reserved memory block stored in the secure memory location.

Example 42 includes the subject matter of any of Examples 38-41, and further including means for authenticating the pre-boot firmware environment; wherein the means for reserving the reserved memory block comprises means for reserving the reserved memory block in response to authenticating the pre-boot firmware environment; and wherein the means for storing the wake routine in the secure memory location comprises means for storing the wake routine in the secure memory location in response to authenticating the pre-boot firmware environment.

Example 43 includes the subject matter of any of Examples 38-42, and wherein the secure memory location comprises a system management mode memory region of the computing device.

Example 44 includes the subject matter of any of Examples 38-43, and further including means for booting the operating system in response to storing the wake routine in the secure memory location.

Example 45 includes the subject matter of any of Examples 38-44, and further including means for generating the request to enter the sleep power management mode.

Example 46 includes the subject matter of any of Examples 38-45, and wherein the means for generating the request to enter the sleep power management mode comprises means for generating a request to enter an ACPI S3 state.

Example 47 includes the subject matter of any of Examples 38-46, and wherein the means for generating the request to enter the sleep power management mode comprises means for writing a predetermined value to a power management control register.

Example 48 includes the subject matter of any of Examples 38-47, and further including means for initializing, by the system management interrupt handler, a hardware component of the computing device for the low-power idle state.

Example 49 includes the subject matter of any of Examples 38-48, and further including means for saving a processor state of a processor of the computing device to the secure memory location to generate a saved processor state in response to triggering the system management interrupt; and means for modifying, by the system management interrupt handler, the saved processor state to execute in the second processor mode; wherein the means for resuming execution of the computing device comprises means for resuming execution of the computing device in response to modifying the saved processor state.

Example 50 includes the subject matter of any of Examples 38-49, and further including means for modifying, by the system management interrupt handler, a saved instruction pointer register value of the saved processor state to point to the wake routine stored in the reserved memory block; wherein the means for resuming execution of the computing device further comprises means for resuming execution of the computing device in response to modifying the saved instruction pointer register value.

Example 51 includes the subject matter of any of Examples 38-50, and wherein the means for entering the low-power idle state comprises means for entering an S0ix processor state.

Example 52 includes the subject matter of any of Examples 38-51, and further including means for storing, by the wake routine, a device state of a peripheral device of the computing device in response to resuming execution of the computing device; wherein the means for entering the low-power idle state comprises means for entering the low-power idle state in response to storing the device state.

Example 53 includes the subject matter of any of Examples 38-52, and further including means for jumping, by the wake routine, to a wake vector of the operating system in response to entering the low-power idle state.

Example 54 includes the subject matter of any of Examples 38-53, and further including means for determining whether a wake event has occurred in response to entering the low-power idle state; and means for updating, by the wake routine, a power management status register based on the wake event in response to determining that the wake event has occurred; wherein the means for jumping to the wake vector comprises means for jumping to the wake vector in response to updating the power management status register.

The invention claimed is:

1. A computing device for hybrid sleep power management, the computing device comprising:
a security module to: (i) reserve, during a pre-boot firmware environment of the computing device, a reserved memory block and (ii) store, during the pre-boot firmware environment, a wake routine in a secure memory location that is not accessible by an operating system of the computing device;
a system management module to: (i) trigger a system management interrupt in response to a request to enter a sleep power management mode generated by the operating system in a first processor mode, (ii) copy, by a system management interrupt handler of the computing device, the wake routine from the secure memory location to the reserved memory block in response to triggering of the system management interrupt, (iii) save a processor state of a processor of the computing device to the secure memory location to generate a saved processor state in response to the triggering of the system management interrupt, (iv) modify, by the system management interrupt handler, the saved processor state to execute in a second processor mode, and (v) resume, by the system management interrupt handler, execution of the computing device in the second processor mode starting at the wake routine stored in the reserved memory block in response to modification of the saved processor state; and
a wake code module to enter, by the wake routine of the computing device, a low-power idle state in response to resumption of execution in the second processor mode.

2. The computing device of claim 1, wherein the secure memory location comprises a system management mode memory region of the computing device.

3. The computing device of claim 1, further comprising a sleep module to:
generate, by the operating system, the request to enter the sleep power management mode.

4. The computing device of claim 3, wherein to generate the request to enter the sleep power management mode comprises to generate a request to enter an advanced configuration and power interface (ACPI) S3 state.

5. The computing device of claim 3, wherein to generate the request to enter the sleep power management mode comprises to write a predetermined value to a power management control register.

6. The computing device of claim 1, wherein the system management module is further to:
 modify, by the system management interrupt handler, a saved instruction pointer register value of the saved processor state to point to the wake routine stored in the reserved memory block;
 wherein to resume execution of the computing device further comprises to resume execution of the computing device in response to modification of the saved instruction pointer register value.

7. The computing device of claim 1, wherein the low-power idle state comprises an S0ix processor state.

8. The computing device of claim 1, wherein:
 the wake code module is further to jump, by the wake routine, to a wake vector of the operating system in response to entrance to the low-power idle state.

9. A method for hybrid system sleep, the method comprising:
 reserving, during a pre-boot firmware environment of a computing device, a reserved memory block;
 storing, during the pre-boot firmware environment of the computing device, a wake routine in a secure memory location that is not accessible by an operating system of the computing device;
 triggering, by the computing device, a system management interrupt in response to a request to enter a sleep power management mode generated by the operating system in a first processor mode;
 copying, by a system management interrupt handler of the computing device, the wake routine from the secure memory location to the reserved memory block in response to triggering the system management interrupt;
 saving, by the computing device, a processor state of a processor of the computing device to the secure memory location to generate a saved processor state in response to triggering the system management interrupt;
 modifying, by the system management interrupt handler, the saved processor state to execute in the second processor mode;
 resuming, by the system management interrupt handler, execution of the computing device in the second processor mode starting at the wake routine stored in the reserved memory block in response to modifying the saved processor state; and
 entering, by the wake routine of the computing device, a low-power idle state in response to resuming execution in the second processor mode.

10. The method of claim 9, wherein the secure memory location comprises a system management mode memory region of the computing device.

11. The method of claim 9, further comprising:
 generating, by the operating system, the request to enter the sleep power management mode.

12. The method of claim 11, wherein generating the request to enter the sleep power management mode comprises generating a request to enter an advanced configuration and power interface (ACPI) S3 state.

13. The method of claim 9, further comprising:
 modifying, by the system management interrupt handler, a saved instruction pointer register value of the saved processor state to point to the wake routine stored in the reserved memory block;
 wherein resuming execution of the computing device further comprises resuming execution of the computing device in response to modifying the saved instruction pointer register value.

14. One or more non-transitory, computer-readable storage media comprising a plurality of instructions that in response to being executed cause a computing device to:
 reserve, during a pre-boot firmware environment, a reserved memory block;
 store, during the pre-boot firmware environment, a wake routine in a secure memory location that is not accessible by an operating system of the computing device;
 trigger a system management interrupt in response to a request to enter a sleep power management mode generated by the operating system in a first processor mode;
 copy, by a system management interrupt handler, the wake routine from the secure memory location to the reserved memory block in response to triggering the system management interrupt;
 save a processor state of a processor of the computing device to the secure memory location to generate a saved processor state in response to triggering the system management interrupt;
 modify, by the system management interrupt handler, the saved processor state to execute in the second processor mode;
 resume, by the system management interrupt handler, execution of the computing device in the second processor mode starting at the wake routine stored in the reserved memory block in response to modifying the saved processor state; and
 enter, by the wake routine, a low-power idle state in response to resuming execution in the second processor mode.

15. The one or more non-transitory, computer-readable storage media of claim 14, wherein the secure memory location comprises a system management mode memory region of the computing device.

16. The one or more non-transitory, computer-readable storage media of claim 14, further comprising a plurality of instructions that in response to being executed cause the computing device to:
 generate, by the operating system, the request to enter the sleep power management mode.

17. The one or more non-transitory, computer-readable storage media of claim 16, wherein to generate the request to enter the sleep power management mode comprises to generate a request to enter an advanced configuration and power interface (ACPI) S3 state.

18. The one or more non-transitory, computer-readable storage media of claim 14, further comprising a plurality of instructions that in response to being executed cause the computing device to:
 modify, by the system management interrupt handler, a saved instruction pointer register value of the saved processor state to point to the wake routine stored in the reserved memory block;
 wherein to resume execution of the computing device further comprises to resume execution of the computing device in response to modifying the saved instruction pointer register value.

19. The one or more non-transitory, computer-readable storage media of claim 14, further comprising a plurality of instructions that in response to being executed cause the computing device to:

jump, by the wake routine, to a wake vector of the operating system in response to entering the low-power idle state.

\* \* \* \* \*